(12) United States Patent
Rother, Sr.

(10) Patent No.: US 11,148,514 B2
(45) Date of Patent: Oct. 19, 2021

(54) INFLATABLE VEHICLE COVER

(71) Applicant: Roland S Rother, Sr., San Antonio, TX (US)

(72) Inventor: Roland S Rother, Sr., San Antonio, TX (US)

(*) Notice: Subject to any disclaimer, the term of this patent is extended or adjusted under 35 U.S.C. 154(b) by 373 days.

(21) Appl. No.: 16/373,823

(22) Filed: Apr. 3, 2019

(65) Prior Publication Data

US 2019/0337371 A1    Nov. 7, 2019

Related U.S. Application Data

(60) Provisional application No. 62/666,763, filed on May 4, 2018.

(51) Int. Cl.
*B60J 11/04* (2006.01)
(52) U.S. Cl.
CPC ..................... *B60J 11/04* (2013.01)
(58) Field of Classification Search
CPC ...................................................... B60J 11/04
See application file for complete search history.

(56) References Cited

U.S. PATENT DOCUMENTS

| | | | | |
|---|---|---|---|---|
| 4,294,483 A * | 10/1981 | Ferris | ............ | B60J 11/00 180/84 |
| 5,242,206 A * | 9/1993 | Heck | ............ | B60J 11/00 150/166 |
| 5,701,622 A * | 12/1997 | Biggie | ............ | A61G 7/05776 5/710 |
| 5,890,525 A | 4/1999 | Shores | | |
| 6,044,881 A | 4/2000 | Welch et al. | | |
| 6,070,629 A | 6/2000 | Whiteside | | |
| 7,234,770 B1 * | 6/2007 | Schiebl | ............ | A47C 7/0213 297/219.1 |
| 7,360,820 B2 * | 4/2008 | Tellez | ............ | B60J 11/00 150/166 |
| 9,156,339 B1 | 10/2015 | Perez et al. | | |
| 9,770,966 B1 * | 9/2017 | Gill | ............ | B60J 11/04 |
| 2004/0178657 A1 * | 9/2004 | Tellez | ............ | B60J 11/00 296/136.02 |
| 2013/0292963 A1 * | 11/2013 | Carabajal | ............ | B60J 11/04 296/136.07 |
| 2016/0185200 A1 * | 6/2016 | Molina | ............ | B60J 11/04 296/136.02 |

* cited by examiner

*Primary Examiner* — James N Smalley
*Assistant Examiner* — Justin Caudill
(74) *Attorney, Agent, or Firm* — Boudwin Intellectual Property; Daniel Boudwin

(57) ABSTRACT

An inflatable vehicle cover. The inflatable vehicle cover has a plurality of inflatable air chambers in fluid communication with each other. At least one valve is connected to the plurality of inflatable air chambers. A pump that inflates and deflates the inflatable air chambers is removably securable to the valve. A plurality of fastening straps that secure the inflatable vehicle cover over a vehicle is connected to the underside of the plurality of inflatable air chambers. The underside surface of the inflatable vehicle cover includes a material that covers the plurality of fastening straps to prevent the inflatable vehicle cover from damaging the exterior of the vehicle. The inflatable vehicle cover is removably securable to the exterior of a vehicle to protect the vehicle from inclement weather and debris.

10 Claims, 3 Drawing Sheets

INFLATABLE VEHICLE COVER

CROSS REFERENCE TO RELATED APPLICATIONS

This application claims the benefit of U.S. Provisional Application No. 62/666,763 filed on May 4, 2018. The above identified patent application is herein incorporated by reference in its entirety to provide continuity of disclosure.

BACKGROUND OF THE INVENTION

The present invention relates to vehicle covers. More particularly, the present invention provides an inflatable vehicle cover that is specifically designed to protect a vehicle from inclement weather and debris.

After driving their vehicles, individuals park and leave the vehicle in a designated parking area. Some individuals protect their vehicles by utilizing a garage or car port. However, where such protective enclosures are not available, many individuals are forced to leave their vehicle exposed. Inclement weather such as hail, freezing rain, and snow, as well as debris that can be blow around by strong winds, can damage the exterior surface of the vehicle where the vehicle is left unprotected. Such inclement weather can come at a moment's notice, thereby leaving little time for a vehicle owner to protect their vehicle. The damage that can result from such weather includes costly repairs to the paint and protective coatings on the vehicle. With severe precipitation such as hail, the underlying body of a vehicle can become dented and damaged, requiring time-consuming and even more costly repairs. In view of these concerns, it is desirable to provide a vehicle cover that protects a vehicle from hail and other potentially damaging objects when the vehicle is parked in an uncovered location.

Devices have been disclosed in the known art that relate to vehicle covers. These include devices that have been patented and disclosed in patent application publications. However, the devices in the known art have several drawbacks. Traditional vehicle covers typically provide superficial coverage of the vehicle's exterior surface and do not protect the vehicle from impact damage. Some vehicle covers are bulky and require extensive time to install on the vehicle. Furthermore, finding a vehicle cover that adequately covers a vehicle's specific shape and contours, and is firmly secured thereto, can often be difficult given the wide array of vehicles in use.

The present invention substantially diverges in design elements from the known art and consequently it is clear that there is a need in the art for an improvement to existing vehicle cover devices. In this regard the present invention substantially fulfills these needs. Accordingly, an inflatable vehicle cover that can quickly and effectively secure to a vehicle's exterior surface without damaging the vehicle and can provide protective coverage from inclement weather and debris is desired.

SUMMARY OF THE INVENTION

In view of the foregoing disadvantages inherent in the known types of vehicle covers now present in the prior art, the present invention provides an inflatable vehicle cover wherein the same can be utilized to quickly and effectively protect the exterior surface of a vehicle from inclement weather and debris. The present inflatable vehicle cover comprises a plurality of air chambers in fluid communication with each other, a valve through which the plurality of air chambers can be inflated or deflated, a plurality of straps that secure the inflatable vehicle cover to the vehicle, and a protective material which prevents the inflatable vehicle cover from damaging the exterior surface of the vehicle.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
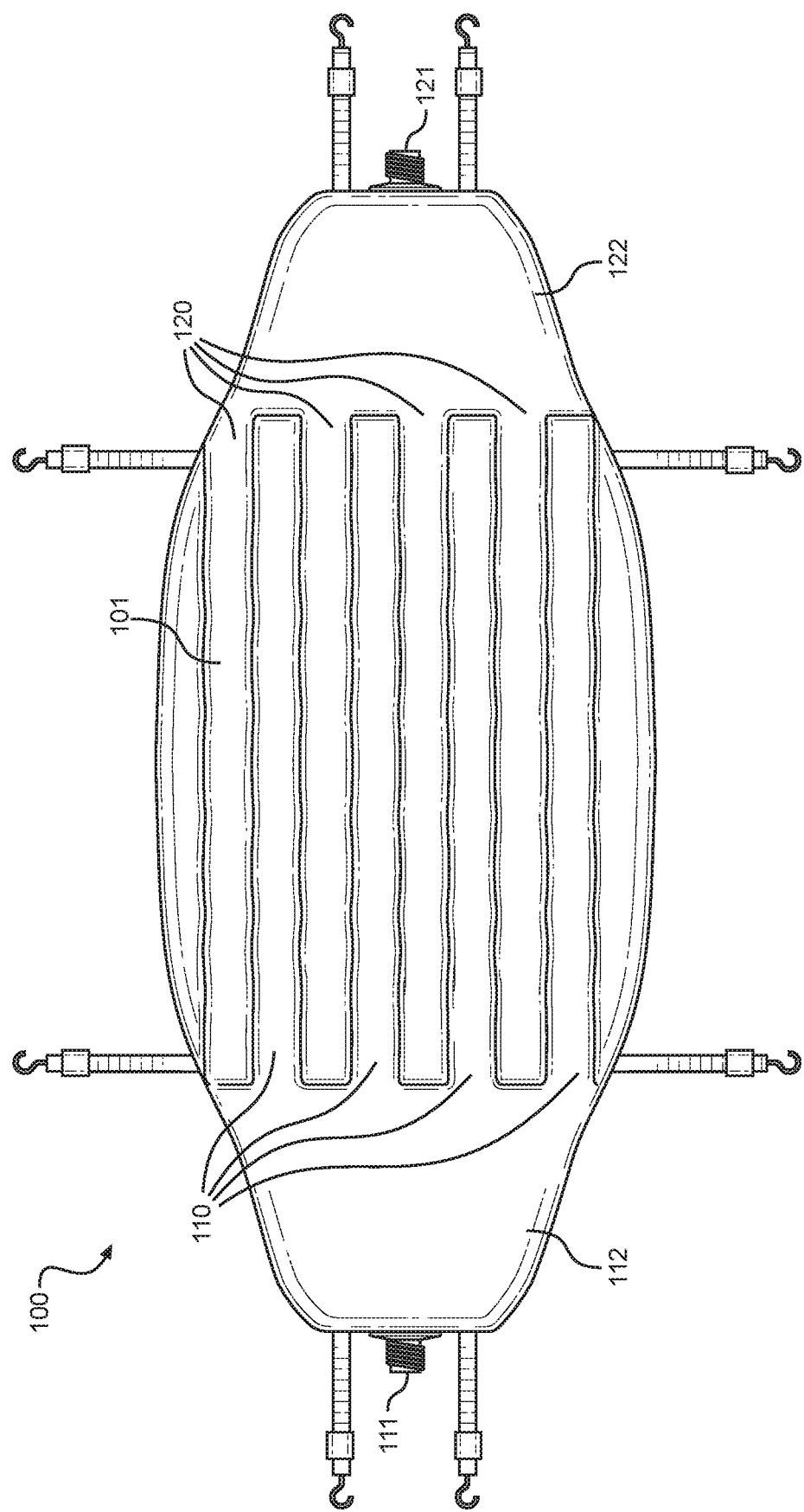
FIG. 1 shows a top plan view of an embodiment of the inflatable vehicle cover.

Reference is made herein to the attached drawings. Like reference numerals are used throughout the drawings to depict like or similar elements of the inflatable vehicle cover. For the purposes of presenting a brief and clear description of the present invention, a preferred embodiment will be discussed as used for providing an inflatable vehicle cover that is configured to protect a vehicle from hail and other objects that impact the vehicle. The figures are intended for representative purposes only and should not be considered to be limiting in any respect.

Referring now to FIG. 1, there is shown a plan view of an embodiment of the inflatable vehicle cover. The inflatable vehicle cover 100 is composed of a material that is durable, puncture resistant, and weather resistant. Additionally, the inflatable vehicle cover 100 is able to withstand inclement weather and impacts from debris without ripping or tearing. Accordingly, the inflatable vehicle cover 100 can include materials such as, but not limited to, nylon, rubber, vinyl, cloth, or canvas.

The inflatable vehicle cover 100 comprises a plurality of inflatable air chambers 101 in fluid communication with each other. In one embodiment, each inflatable air chamber 101 is configured to absorb the impact of precipitation in the form of hail when inflated. At least one valve is connected to the plurality of inflatable air chambers 101. In the shown embodiment, a first grouping 110 of inflatable air chambers 101 and a second grouping 120 of inflatable air chambers 101 define a first inflatable portion 112 of the inflatable vehicle cover 100 and a second inflatable portion 122 of the inflatable vehicle cover 100, respectively. In the shown embodiment, the inflatable air chambers 101 of the first grouping 110 are interwoven with the inflatable air chambers 101 of the second grouping 120. In such an embodiment, inflation of only one portion provides coverage to a vehicle on which the inflatable vehicle cover 100 is disposed, and the lack of inflation of the other portion will not preclude the use of the first portion. In other embodiments, the first grouping 110 and the second grouping 120 are intertwined and interwoven.

In one embodiment, a first valve 111 is in fluid communication with the first grouping 110 of inflatable air chambers 101 and a second valve 121 is in fluid communication with the second grouping 120 of inflatable air chambers 101. In such a configuration, where either the first grouping 110 of inflatable air chambers 101 or the second grouping 120 of inflatable air chambers 101 fail to inflate, the other inflatable portions of the inflatable vehicle cover are able to be utilized. By forming two distinct and separate inflatable portions 112, 122 of the inflatable vehicle cover 100, the lack of inflation of one portion will not preclude the use of another portion. It is contemplated by this disclosure that any number of such inflatable portions can be included, each consisting of a singular or plurality of air chambers, thereby providing coverage in the event of failure of a subset of air chambers. In one embodiment, a singular valve can be connected to multiple inflatable portions 112, 122, thereby allowing a user to inflate multiple portions of the inflatable vehicle cover at one time.

Figure 2:
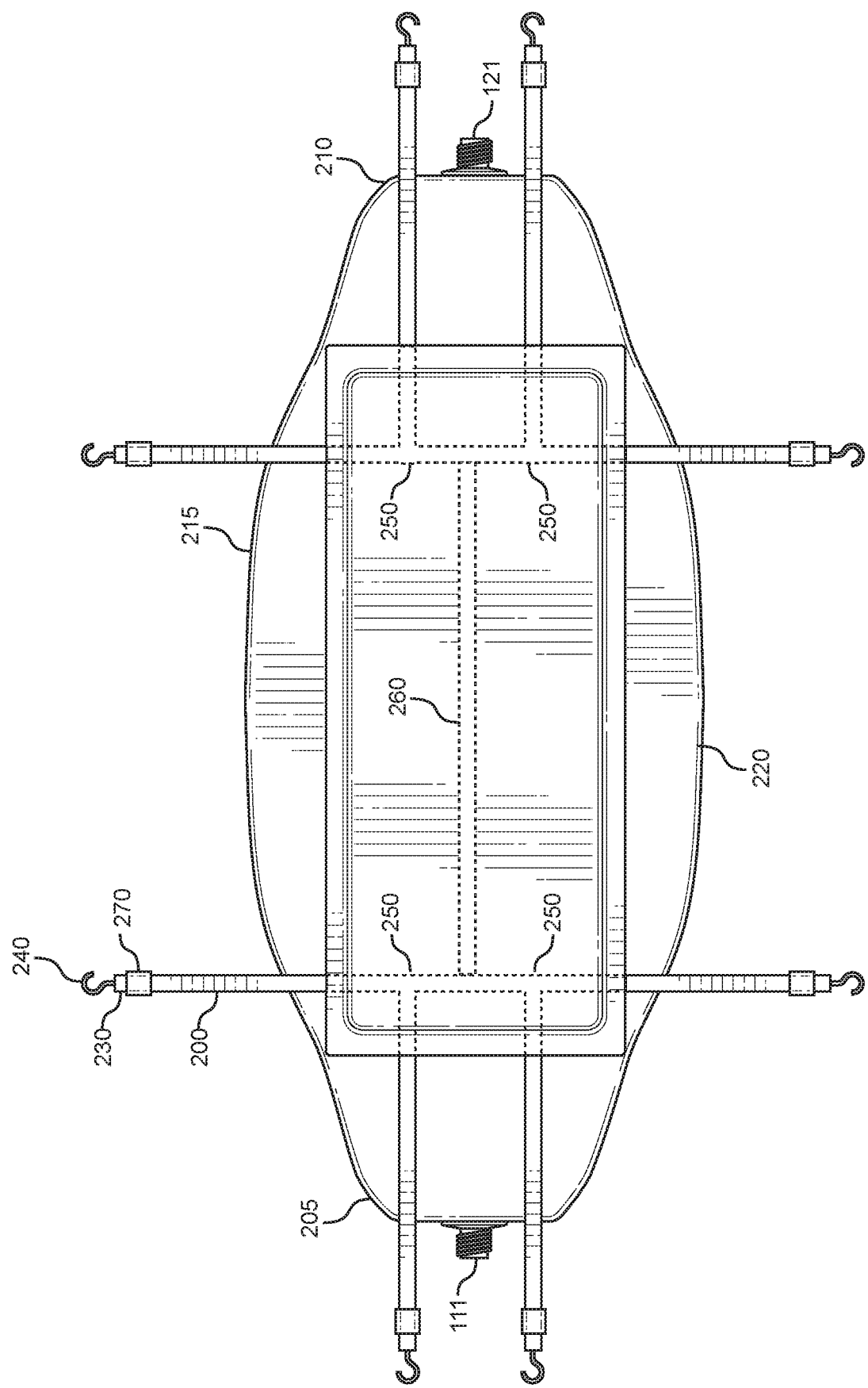
FIG. 2 shows a bottom plan view of an embodiment of the inflatable vehicle cover.

Referring now to FIG. 2, there is shown a bottom plan view of an embodiment of the inflatable vehicle cover. A plurality of fastening straps 200 is disposed on an underside surface of the plurality of inflatable air chambers. In the shown embodiment, eight fastening straps 200 in total are disposed and interconnected on the underside surface of the plurality of inflatable air chambers. The fastening straps 200 comprises a medial portion 250 at which the fastening straps 200 can interconnect and a distal portion 230 which extends beyond the circumference of the plurality of inflatable chambers. A connecting hook 240 is disposed at the distal portion 230 of the fastening straps 200. In one embodiment, the connecting hook 240 is configured to secure to a wheel-well of a vehicle. In another embodiment, the connecting hook 240 is configured to secure to a fender well of a vehicle. In yet another embodiment, the connecting hook 240 is configured to secure to the undercarriage of the vehicle's body. The connecting hook 240 may additionally be secured to any suitable attachment point. In one embodiment, the distal portion 230 can extend to the circumference of the plurality of inflatable chambers. In another embodiment, the distal portion 230 can extend to a point that ends before the circumference of the plurality of inflatable chambers.

In the shown embodiment, two fastening straps 200 are disposed such that the distal portions 230 of the fastening straps 200 extend from the rear portion 205 of the inflatable vehicle cover, one on either side of the first valve 111; two distal portions 230 of the fastening straps 200 extend from the front portion 210 of the inflatable vehicle cover, one on either side of the second valve 121; two distal portions 230 of the fastening straps 200 extend from the left portion 215 of the inflatable vehicle cover; and two distal portions 230 of the fastening straps 200 extend from a right portion 220 of the inflatable vehicle cover. An interconnecting strap 260 is disposed along the length of the inflatable vehicle cover, configured to connect the fastening straps 200 on one end of the vehicle to the fastening straps in the other end of the vehicle. In the shown embodiment, the fastening straps include a length-adjusting collar 270 that is utilized to shorten and lengthen the straps. Through utilization of the connecting hooks 240 around the inflatable vehicle cover, each portion of the inflatable vehicle cover can be secured to a front, back, left and right side of a vehicle and the length of the fastening straps 200 can be adjusted by the length-adjusting collar 270 to ensure a secure fit.

Figure 3:
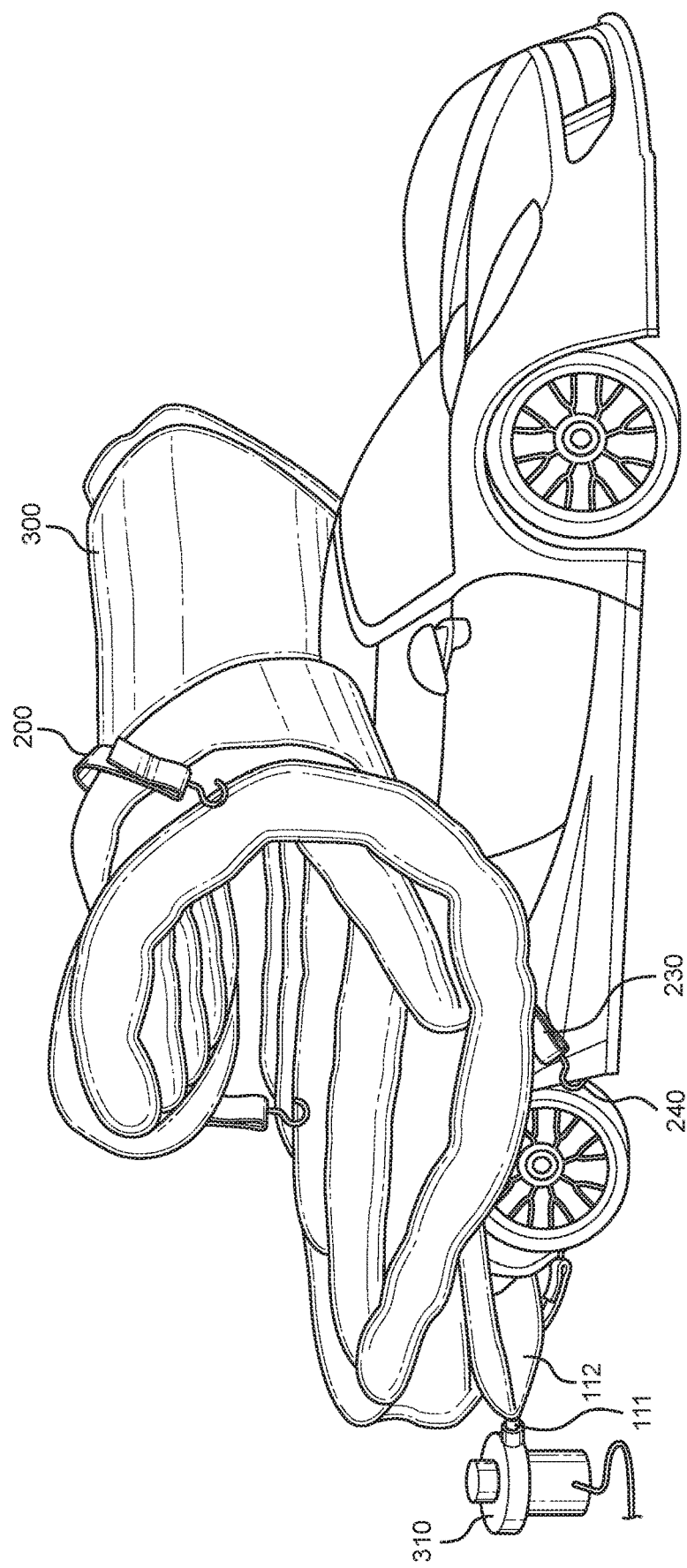
FIG. 3 shows a perspective view of an embodiment of the inflatable vehicle cover.

Referring now to FIG. 3, there is shown a perspective view of an embodiment of the inflatable vehicle cover. The underside surface of the inflatable vehicle cover includes a material 300 that covers the medial portion of the plurality of fastening straps 200 to prevent the inflatable vehicle cover from damaging the exterior of the vehicle. In one embodiment, the material 300 is a non-abrasive material, such that when the inflatable vehicle cover slides over the exterior surface of the vehicle, the inflatable vehicle cover does not damage the paint or coatings disposed on the exterior surface of the vehicle. In the shown embodiment, the material 300 is disposed over the medial portion of the plurality of fastening straps 200 such that the distal portions 230 of the fastening straps 200 and the connecting hook 240 remain exposed, allowing the user to secure the connecting hook 240 to the vehicle body.

A pump 310 is removably securable to the at least one valve, configured to inflate and deflate the plurality of inflatable air chambers. In the shown embodiment, the pump 310 is secured to the first valve 111, which is in fluid communication with the first inflatable portion 112 comprising the first grouping of inflatable air chambers. In one embodiment, the pump 310 is configured to selectively inflate or deflate multiple inflatable portions of the inflatable vehicle cover at the same time. In one embodiment, the pump 310 is electrically connected to a power source of the vehicle. In a further embodiment, the pump 310 can be electrically connected to a vehicle's cigarette lighter. In other embodiments, the pump 310 can be electrically connected to a power outlet and can include a battery.

In use, an individual can ensure the inflatable vehicle cover is deflated. The individual can then place the inflatable vehicle cover over the exterior surface of the vehicle with the material 300 oriented face down, such that the material 300 is in contact with the exterior surface of the vehicle. The individual can pull the fastening straps 200 down and around the vehicle and utilize the connecting hooks 240 to secure the inflatable vehicle cover to wheel-wells, fender wells, bumpers and other suitable attachment points on the body of the vehicle. In such a manner, the inflatable vehicle cover can cover the roof of the vehicle and drape over the sides, front, and back of the vehicle, thereby providing coverage of the body, hood, side panels, front grills, headlights, rear lights, windshields, and other desired areas of the vehicle to be protected. The length adjusting collar can be utilized to adjust the length of the fastening straps 200 such that the inflatable vehicle cover is secured in place. In such a manner, an individual can determine how much of the exterior of the vehicle is covered by the inflatable vehicle cover. The individual can removably secure the pump 310 to a valve and an electrical power supply. The pump 310 can then be turned on to inflate the plurality of inflatable chambers. In such a manner, the inflatable vehicle cover can be secured over the exterior of a vehicle and protect said vehicle from inclement weather such as hail, freezing rain, or snow, and additionally protect said vehicle from debris that may fall or be thrust into the vehicle from strong winds.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An inflatable vehicle cover, comprising:
   a plurality of inflatable air chambers in fluid communication with each other;
   at least one valve in fluid communication with the plurality of inflatable air chambers, wherein the at least one valve is configured to receive a pump;
   a first group of fastening straps disposed on an underside of the plurality of inflatable air chambers at a rear end of the inflatable cover;
   a second group of fastening straps disposed on the underside of the plurality of inflatable air chambers at a front end of the inflatable cover;
   an interconnecting strap connecting a first medial portion of the first group of fastening straps to a second medial portion of the second group of fastening straps;
   a non-abrasive material disposed on an underside surface of the plurality of inflatable air chambers;
   wherein the first group of fastening straps and the second group of fastening straps are disposed between the plurality of inflatable air chambers and the non-abrasive material.

2. The inflatable vehicle cover of claim 1, wherein the plurality of inflatable air chambers are configured to absorb the impact of precipitation in the form of hail.

3. The inflatable vehicle cover of claim 1, wherein the non-abrasive material is configured to prevent damage to an exterior of a vehicle.

4. The inflatable vehicle cover of claim 1, wherein the plurality of inflatable air chambers comprises a first grouping of air chambers and a second grouping of inflatable air chambers that are in fluid communication with each other.

5. The inflatable vehicle cover of claim 4, wherein the at least one valve comprises a first valve that is in fluid communication with the first grouping of inflatable air chambers and a second valve that is in fluid communication with the second grouping of inflatable air chambers.

6. The inflatable vehicle cover of claim 4, wherein the first grouping of inflatable air chambers and the second grouping of inflatable air chambers are interwoven.

7. The inflatable vehicle cover of claim 4, wherein the at least one valve comprises a single valve that is in fluid communication with both the first grouping of inflatable air chambers and the second grouping of inflatable air chambers.

8. The inflatable vehicle cover of claim 4, wherein the first valve is disposed on a rear portion of the cover and the second valve is disposed on a front portion of the cover.

9. The inflatable vehicle cover of claim 1, wherein at least one fastening strap of the plurality of fastening straps comprises a length adjustment collar that can be utilized to shorten or lengthen the at least one fastening strap.

10. The inflatable vehicle cover of claim 1, wherein the plurality of straps comprises two fastening straps disposed such that distal portions of the two fastening straps extend from a rear portion of the inflatable vehicle cover on either side of a first valve of the at least one valve.

* * * * *